United States Patent Office 3,652,587
Patented Mar. 28, 1972

3,652,587
1-(p-OXYPHENETHYL)-3-(m-OXYPHENYL) PYRROLIDINE COMPOUNDS
Ian Moyle Lockhart, Egham, England, assignor to Parke, Davis & Company, Detroit, Mich.
No Drawing. Filed Aug. 25, 1969, Ser. No. 852,937
Claims priority, application Great Britain, Sept. 11, 1968, 43,269/68
Int. Cl. C07d 27/04
U.S. Cl. 260—326.3                4 Claims

ABSTRACT OF THE DISCLOSURE m - [1 - (p - hydroxyphenethyl) - 3 - alkyl - 3 - pyrrolidinyl]-phenols in which the 3-alkyl group contains from 2 to 5 carbon atoms inclusive; esters thereof; and salts of the foregoing compounds. These compounds are pharmacological agents. The phenols can be prepared by cleavage of the corresponding lower alkyl, benzyl, or substituted benzyl ethers. The esters can be prepared by esterification of the phenols.

SUMMARY AND DETAILED DESCRIPTION

The present invention relates to new pyrrolidine compounds. More particularly, the invention relates to new 1 - (p-oxyphenethyl) - 3 - (m-oxyphenyl)pyrrolidine compounds of the formula

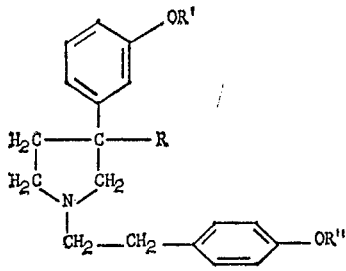

to salts thereof, and to methods for the production of the foregoing compounds; where R represents an alkyl radical containing from 2 to 5 carbon atoms inclusive; and each of R' and R" represents hydrogen or a group of the formula

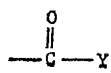

where Y represents lower alkyl, cyclopropyl, or cyclobutyl. The term "lower alkyl" as used herein indicates an alkyl radical of not more than 6 carbon atoms.

In accordance with the invention, the phenols of the invention, that is the compounds of the above formula wherein R' and R" represent hydrogen, and salts thereof, can be produced by reacting a compound of the formula

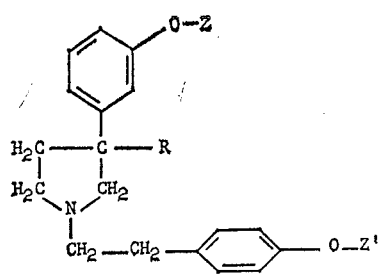

or a salt thereof with a reagent capable of cleaving the ether linkage; where R is as defined before and each of Z and Z' represents lower alkyl, benzyl, or substituted benzyl. The term "substituted benzyl" as used herein means benzyl substituted by one or more relatively unreactive groups such as lower alkyl. When Z and Z' represent lower alkyl, a suitable reagent capable of cleaving the ether linkage is an acidic reagent. The treatment with an acidic reagent is followed, when necessary, by decomposition of an intermediate aluminum or boron complex which may be formed. Some examples of suitable acidic reagents are hydriodic acid, hydrobromic acid, hydrogen bromide in acetic acid, aluminum chloride in carbon disulfide, aluminum chloride in nitrobenzene, aluminum bromide in benzene, pyridine hydrochloride, and boron tribromide. The preferred acidic reagent is 48% (constant boiling) hydrobromic acid, or boron tribromide. With hydrobromic acid, it is preferred to use a large excess of this reagent as a solvent. An additional solvent is not necessary and the reaction is commonly carried out for from 1 to 3 hours at the reflux temperature. In the case of other acidic reagents, the reaction conditions are modified as necessary. For example, in the case of boron tribromide, it is convenient to carry out the reaction in an unreactive solvent such as a hydrocarbon or a halogenated hydrocarbon for from 15 minutes to 12 hours at a temperature of approximately −70 to +50° C. It is preferable to conduct the reaction at about −60° C. while the reactants are being mixed and then allow the reaction mixture to warm to room temperature. The resulting product is formed as a boron complex which is then decomposed with a hydroxylic solvent such as methanol. When Z and Z' represent benzyl or substituted benzyl, a suitable reagent capable of cleaving the ether linkage is a hydrogenation reagent such as hydrogen in the presence of a hydrogenation catalyst, typically a Raney nickel or noble metal catalyst. Some suitable solvents in this case are water, lower alkanols, dioxane, and acetic acid. The time and temperature of the reaction are not critical and hydrogenation is continued until the calculated amount of hydrogen has been absorbed. It is satisfactory to use temperatures ranging from 0 to 100° C. or more and pressures from 1 to 200 atmospheres or more but the higher temperatures and pressures are not necessary. Using palladium on charcoal catalyst, the reaction proceeds at a satisfactory rate at room temperaure and atmospheric pressure. In all of the above cases, the product can be isolated as an acid-addition salt, as the free base, or as a phenolate salt, following adjustment of the pH as required.

Starting materials required for use in the foregoing process can be prepared by any of a variety of methods. For example, a lower alkoxybenzyl cyanide or a benzyloxybenzyl cyanide is reacted with sodium amide and then with an alkyl halide containing from 2 to 5 carbon atoms inclusive, preferably an alkyl bromide, to produce an α-alkyl-m-lower alkoxybenzyl cyanide or an α-alkyl-m-benzyloxybenzyl cyanide of the formula

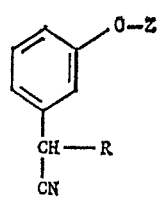

This compound is reacted with sodium amide and then with ethylene dichloride to give a chlorinated cyano intermediate having the formula

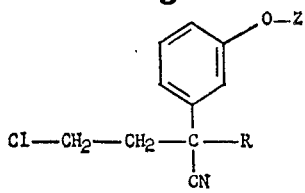

The latter product is cyclized by reaction with lithium aluminum hydride and the product hydrolyzed to give a compound of the formula

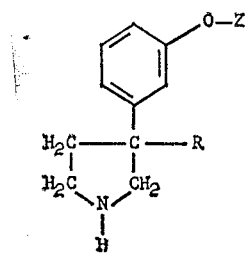

This compound is reacted with a p-lower alkoxyphenylacetyl chloride or a p-benzyloxyphenylacetyl chloride to give a compound of the formula

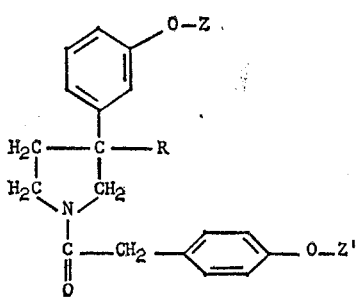

The later compound is reacted with lithium aluminum hydride and the product hydrolyzed to give a compound of the formula

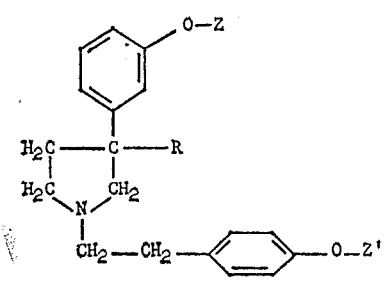

which is a starting material in the foregoing process. In these formulas R, Z, and Z' are as defined before. The starting materials can also be prepared by the help of other reactions. For example, a 3-(m-methoxyphenyl)-3-alkylpyrrolidine is reacted with acetic anhydride in acetic acid and the resulting 1-acetyl-3-(m-methoxyphenyl)-3-alkylpyrrolidine is reacted with an acidic reagent capable of cleaving the ether linkage to produce a 1-acetyl-3-(m-hydroxyphenyl)-3-alkylpyrrolidine. The latter compound is reacted with sodium hydride and benzyl chloride to produce a 1-acetyl-3-(m-benzyloxyphenyl)-3-alkylpyrrolidine which is then converted by hydrolysis with potassium hydroxide in aqueous ethanol to a 3-(m-benzyloxyphenyl)-3-alkylpyrrolidine. The latter compound is reacted with a p-lower alkoxyphenylacetyl chloride or a p-benzyloxyphenylacetyl chloride and the product reduced with lithium aluminum hydride as described above.

Also in accordance with the invention, the esters of the invention, that is the compounds of the formula

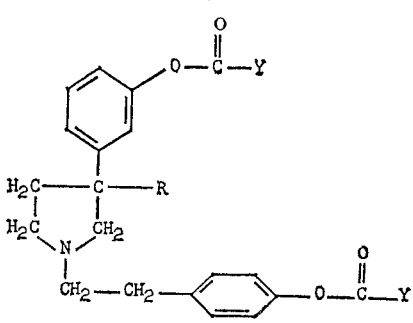

and salts thereof, can be produced by reacting a pyrrolidine compound of the formula

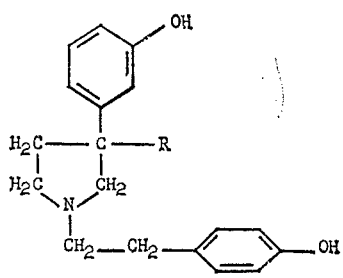

or a reactive derivative thereof, with a carboxylic acid of the formula

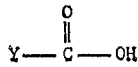

or a reactive derivative thereof; where R and Y are as defined before. Some examples of suitable reactive derivatives of the pyrrolidine compound are the phenolate salts and acid-addition salts. Some examples of suitable reactive derivatives of the carboxylic acid are the acid halides and the acid anhydride. The acid anhydride can be used in combination with an alkali metal carboxylate. At least approximately the calculated amount and preferably an excess of the carboxylic acid or its reactive derivative is used. While the reaction can be run without an additional solvent, it is customary to employ an unreactive or compatible solvent. Some examples of suitable solvents are tertiary amines such as triethylamine, N,N-dimethylaniline, and pyridine; ethers such as diethyl ether and dioxane; hydrocarbons such as benzene and toluene; halogenated hydrocarbons such as ethylene chloride and chloroform; and tertiary amides such as dimethylformamide. Where an acid anhydride is a reactant, an excess of this reagent can be used as a solvent. The reaction is optionally conducted in the presence of an acidic or basic catalyst. When the reactant is a carboxylic acid, a suitable catalyst is a mineral acid. When the reactant is an acid anhydride or acid halide, a suitable catalyst is a tertiary amine. The time and temperature of the reaction are not critical but in general a higher temperature and a longer reaction time are used when a carboxylic acid is the reactant rather than one of its reactive derivatives. Depending on the particular reactants selected, the reaction can be carried out at a temperature from approximately 0 to 180° C. for from a few minutes to 48 hours. In the case of acid anhydrides the usual reaction conditions are 90-100° C. for 1 to 2 hours. The product is isolated either as the free base or as an acid-addition salt by adjustment of the pH as required.

The free bases of the invention form acid-addition salts with any of a variety of inorganic and organic acids. Pharmaceutically - acceptable acid-addition salts are formed by reaction with such acids as hydrochloric, hydrobromic, sulfuric, phosphoric, acetic, succinic, citric, maleic, and pamoic acids. The phenols of the invention also form phenolate salts with any of a variety of bases such as sodium hydroxide, potassium carbonate, and strongly-basic amines. The free bases and the salt forms are interconvertible by adjustment of the pH. They differ in solubility properties but in general are otherwise equivalent for the purposes of the invention. If desired, the compounds of the invention can also be obtained in optically active forms by using an optically pyrrolidine derivative as starting material, or by resolving an optically inactive final product by fractional crystallization of a salt formed with an optically active acid.

The compounds of the invention are new chemical compounds useful as pharmacological agents and as chemical intermediates. They are of particular value as analgesic agents because they have the ability to relieve severe pain without producing side effects commonly associated with the use of alkaloidal analgesics. The analgesic activity of the compounds of the invention in either free base or salt form can be measured in standard assay procedures by administering a compound and observing the change in an animal's sensitivity to pain. One such procedure is described in Journal of Medicinal and Pharmaceutical Chemistry, 4, 1 (1961) and elsewhere. This assay procedure is performed in young rats and is based on measurement of the threshold mechanical pressures applied to the tails of rats required to elicit squeaking. An active analgesic agent raises the threshold tail pressure stimulus required for a squeak response. The compound is rated by administering graded doses of the test compound intraperitoneally and estimating the analgesic potency relative to a standard dose of codeine phosphate. Some preferred compounds of the invention in this assay procedure are m-[1-p-hydroxyphenethyl)-3-propyl-3 - pyrrolidinyl]phenol, m-[1-(p - hydroxyphenethyl)-3-isobutyl-3-pyrrolidinyl]phenol, and m-[1-(p-hydroxyphenethyl)-3-propyl-3-pyrrolidinyl]phenol, diacetate ester. The analgesic potencies of these particular compounds (relative to codeine=1.0) have been determined as 3.5, 5.2, and 3.9 respectively. As indicated above, the compounds of the invention are active parenterally, and they are also active on oral administration.

The invention is illustrated by the following examples.

EXAMPLE 1

A solution of 10.2 g. of 1-(p-methoxyphenethyl)-3-(m-methoxyphenyl) - 3 - propylpyrrolidine hydrochloride and 150 ml. of methylene chloride at —60° C. is treated dropwise with a solution of 13.5 ml. of boron tribromide and 25 ml. of methylene chloride while maintaining the temperature at —60° C. or lower. The mixture is brought to room temperature for 15 minutes and then cooled to 0° C., treated dropwise with 15 ml. of methanol, and evaporated to dryness. The residue is dissolved in 150 ml. of 2 N sodium hydroxide at 50° C., cooled, and saturated with carbon dioxide. This mixture is extracted with several portions of ether and the ether extracts are combined, dried over anhydrous magnesium sulfate, and evaporated to give a residue of m-[1-(p-hydroxyphenethyl)-3-propyl-3-pyrrolidinyl]phenol; M.P. 189–191° C. following crystallization from methanol.

The hydrochloride salt is obtained by adding ethereal hydrogen chloride to a solution of the free base in ether; M.P. 213–215° C. following crystallization from methanol-ether. A salt with citric acid is obtained by mixing a solution of the free base in methanol with a solution of citric acid in methanol and concentrating the mixture to a small volume.

EXAMPLE 2

Following the general procedure of Example 1, the product obtained from 1-(p-methoxyphenethyl)-3-(m-methoxyphenyl)-3-butylpyrrolidine hydrochloride is m-[1 - (p-hydroxyphenethyl)-3-butyl-3-pyrrolidinyl]phenol. The hydrochloride salt is obtained by reacting a solution of the free base in ether with hydrogen chloride; M.P. 196–198° C. following crystallization from isopropyl alcohol.

EXAMPLE 3

Following the general procedure of Example 1, the product obtained from 1-(p-methoxyphenethyl)-3-(m-methoxyphenyl)-3-sec-butylpyrrolidine hydrochloride is m-[1 - (p-hydroxyphenethyl)-3-sec-butyl-3-pyrrolidinyl]phenol. The hydrochloride salt is obtained by treating a solution of the free base in ether with hydrogen chloride; hydrated, M.P. 105–107° C.

EXAMPLE 4

Following the general procedure of Example 1, the product obtained from 1-(p-methoxyphenethyl)-3-(m-methoxyphenyl)-3-isobutylpyrrolidine hydrochloride is m-[1-(p-hydroxyphenethyl)-3-isobutyl - 3 - pyrrolidinyl]phenol. The hydrochloride salt is obtained by treating a solution of the free base in ether with hydrogen chloride; hydrated, M.P. 201–202° C. following crystallization from acetone.

EXAMPLE 5

Following the general procedure of Example 1, the product obtained from 1-(p-methoxyphenethyl)-3-(m-methoxyphenyl)-3-ethylpyrrolidine hydrochloride is m-[1-(p-hydroxyphenethyl)-3-ethyl - 3 - pyrrolidinyl]phenol. A salt with tartaric acid is obtained by reacting equimolar amounts of the free base and tartaric acid in methanol and evaporating the mixture to a small volume.

EXAMPLE 6

Following the general procedure of Example 1, the product obtained from 1-(p-methoxyphenethyl)-3-(m-methoxyphenyl)-3-isopentylpyrrolidine hydrochloride is m-[1 - (p-hydroxyphenethyl)-3-isopentyl-3-pyrrolidinyl]phenol; M.P. 97–99° C.

A sodium salt is obtained by dissolving 3.53 g. of the above product in ethanol, adding 10 ml. of 1 N sodium hydroxide, and concentrating the mixture to dryness. A potassium salt is obtained by substituting 10 ml. of 1 N potassium hydroxide for the sodium hydroxide.

EXAMPLE 7

A mixture of 11.1 g. of 1-(p-benzyloxyphenethyl)-3-(m-benzyloxyphenyl)-3-propylpyrrolidine, 100 ml. of ethanol, and 1.5 g. of 10% palladium on charcoal catalyst is shaken in contact with a hydrogen atmosphere at room temperature and atmospheric pressure. After the calculated amount of hydrogen has been absorbed, the catalyst is removed by filtration and the filtrate evaporated to dryness. The residue is dissolved with carbon dioxide and extracted with ether. The ether extract is dried over anhydrous magnesium sulfate, filtered, and evaporated to give a residue of m-[1-(p-hydroxyphenethyl)-3-propyl-3-pyrrolidinyl]phenol. The hydrochloride salt is obtained by dissolving the free base in ether and adding hydrogen chloride; M.P. 189–191° C. following crystallization from methanol.

EXAMPLE 8

A solution of 8 g. of m-[1-(p-hydroxyphenethyl)-3-propyl-3-pyrrolidinyl]phenol hydrochloride, 8 g. of sodium acetate, and 80 ml. of acetic anhydride is stirred at 90–100° C. for one hour, cooled, and then poured into 500 ml. of ice water. The mixture is stirred for 15 minutes more and then the aqueous solution is washed with ether and neutralized with 6 N ammonium hydroxide. The neutralized aqueous mixture is extracted with ether and the ether extract is dried over anhydrous magnesium sulfate, concentrated to a small volume, and distilled in vacuo. The product, m-[1-(p-hydroxyphenethyl)-3-propyl-3-pyrrolidinyl]phenol, diacetate ester is collected at B.P. 232–236° C. (0.3 mm.). The hydrochloride salt is obtained by dissolving the free base in ether and adding hydrogen chloride. A salt with citric acid is obtained by mixing a solution of the free base in methanol with a solution of citric acid in methanol and concentrating the mixture.

By the foregoing general procedure, from m[1-(p-hydroxyphenethyl)-3-ethyl-3 - pyrrolidinyl]phenol hydrochloride, sodium propionate, and propionic anhydride, the product obtained is m-[1-(p-hydroxyphenethyl)-3-ethyl-3-pyrolidinyl]phenol, dipropionate ester.

EXAMPLE 9

A solution of 6.5 g. of m-[1-(p-hydroxyphenethyl) - 3-propyl - 3 - pyrrolidinyl]phenol, 4.4 g. of cyclopropanecarbonyl chloride, and 100 ml. of pyridine is heated at 80° C. for one hour and then poured with stirring into 500 ml. of ice water. The insoluble product is collected and partitioned by stirring with a mixture of 300 ml. of water and 300 ml. of ether. The ether phase is separated, dried over anhydrous magnesium sulfate, and evaporated to give a residue of m-[1-(p-hydroxyphenyl)-3-propyl-3-pyrrolidinyl]phenol, dicyclopropanecarboxylate ester.

Starting materials

A stirred suspension of 2.2 g. of 3-(m-methoxyphenyl)-3-propylpyrrolidine, 10 ml. of 2 N sodium hydroxide, and 5 ml. of water is treated at 5° C. with a solution of 1.7 g. of p-methoxyphenylacetyl chloride and 5 ml. of benzene. The mixture is stirred at 5–10° C. for an additional one-half hour, allowed to warm to room temperature, and extracted with ether. The ether extract is washed with 2 N sodium hydroxide, with water, and with 2 N hydrochloric acid. It is then dried over anhydrous magnesium sulfate, concentrated to a small volume and distilled in vacuo. The product, 1-(p-methoxyphenylacetyl) - 3 - (m-methoxyphenyl)-3-propylpyrrolidine, is collected at B.P. 238–242° C. (0.6 mm.). By the same general procedure, the following additional compounds are obtained by reacting a 3-(m-methoxyphenyl)-3-alkylpyrrolidine or a 3-(m-benzyloxyphenyl)-3-alkylpyrrolidine or with p-methoxyphenylacetyl chloride or with p-benzyloxyphenylacetyl chloride. 1-(p-methoxyphenylacetyl) - 3 - (m-methoxyphenyl)-3-butylpyrrolidine. 1-(p-methoxyphenylacetyl)-3-(m-benzyloxyphenyl) - 3 - alkylpyrrolidine with p-methoxyphenylacetyl)-3-(m-methoxyphenyl) - 3 - isobutylpyrrolidine. 1-(p-methoxyphenylacetyl) - 3 - (m - methoxyphenyl)-3 - isopentylpyrrolidine. 1 - (p - methoxyphenylacetyl)-3-(m-methoxyphenyl)-3 - ethylpyrrolidine. 1 - (p-benzyloxyphenylacetyl)-3-(m-benzyloxyphenyl) - 3 - propylpyrrolidine.

A solution of 9.3 g. of 1-(p-methoxyphenylacetyl)-3-(m-methoxyphenyl)-3-propylpyrrolidine in 50 ml. of anhydrous ether is slowly added to a stirred suspension of 3.2 g. of lithium aluminum hydride and 75 ml. of ether. The resulting mixture is heated at reflux for 4 hours, cooled, and hydrolyzed by the dropwise addition of 8 ml. of 2 N sodium hydroxide. The hydrolyzed mixture is filtered and the filtrate is evaporated to dryness and distilled in vacuo to give a distillate of 1-(p-methoxyphenethyl)-3-(m-methoxyphenyl) - 3 - propylpyrrolidine. The hydrochloride salt is obtained by dissolving the free base in ether and adding hydrogen chloride; M.P. 136–137° C. following crystallization from isopropyl alcohol-ether. By the same general procedure, the following additional compounds are obtained by reducing a 1-(p-methoxyphenyl-acetyl)-3-(m-methoxyphenyl)-3-alkylpyrrolidine or a 1-(p-benzyloxyphenylacetyl)-3-(m - benzyloxyphenyl) - 3-alkylpyrrolidine. The hydrochloride salts can also be obtained by dissolving each free base in methylene chloride at 0° C. and adding hydrogen chloride. 1-(p-methoxyphenethyl)-3-(m - methoxyphenyl) - 3 - butylpyrrolidine, B.P. 196–202° C. (0.15 mm.). 1-(p-methoxyphenethyl)-3-(m-methoxyphenyl)-3-sec-butylpyrrolidine; B.P. 195–198° C. (0.1 mm.). 1-(p-methoxyphenethyl)-3-(m-methoxyphenyl)-3-isobutylpyrrolidine, B.P. 202–206° C. (0.35 mm.). 1-(p-methoxyphenethyl) - 3 - (m - methoxyphenyl)-3-isopentylpyrrolidine, B.P. 192–195° C. (0.05 mm.). 1-(p-methoxyphenethyl)-3-(m-methoxyphenyl)-3-ethylpyrrolidine. 1-(p-benzyloxyphenethyl)-3-(m - benzyloxyphenyl)-3-propylpyrrolidine.

A mixture of 21.9 g. of 3-(m-methoxyphenyl)-3-propylpyrrolidine, 40 ml. of acetic acid, and 40 ml. of acetic anhydride is heated at reflux for one hour and then concentrated to remove excess acetic anhydride. The residue is stirred with 125 ml. of 2 N sodium hydroxide and extracted with ether. The ether extract is dried and concentrated and the residue distilled to give 1-acetyl-3-(m-methoxyphenyl)-3 - propylpyrrolidine; B.P. 153–158° C. (0.4 mm.). A solution of 48 g. of this product and 250 ml. of methylene chloride at −60° C. is treated dropwise with 46 ml. of boron tribromide while the temperature is maintained below −50° C. The mixture is held at room temperature for one hour, cooled to −5° C., and treated dropwise with 100 ml. of methanol. It is then poured into 1,000 ml. of saturated sodium bicarbonate solution and extracted with chloroform. The chloroform extract is washed with sodium bicarbonate, dried over anhydrous magnesium sulfate, and evaporated to give a residue of 1-acetyl-3-(m-hydroxyphenyl)-3-propylpyrrolidine; M.P. 147–149° C. following crystallization from benzene. A solution of 12.4 g. of this product in 30 ml. of dry dimethylformamide is added to a suspension of 2.4 g. of a 50% mineral oil dispersion of sodium hydride in 25 ml. of dimethylformamide. The resulting mixture is heated at 50° C. for 15 minutes and then treated dropwise with 5.8 ml. of benzyl chloride. After 2 hours at 50° C., the mixture is concentrated to one-fourth its original volume, poured into 400 ml. of water, and extracted with benzene. The benzene extract is dried, concentrated, and distilled to give 1-acetyl-3-(m-benzyloxyphenyl) - 3 - propylpyrrolidine; B.P. 216–220° C. (0.3 mm.). A solution of 14.8 g. of this product and 50 ml. of ethanol is added to a solution of 80 g. of 85% potassium hydroxide, 80 ml. of water, and 250 ml. of ethanol. The resulting mixture is heated at reflux for 18 hours, concentrated to remove the ethanol, diluted with 300 ml. of water, and extracted with ether. The ether extract is dried and evaporated to give a residue of 3-(m-benzyloxyphenyl)-3-propylpyrrolidine; M.P. 64–66° C. following crystallization from petroleum ether.

A stirred suspension of 15.6 g. of sodium amide in 300 ml. of dry benzene is cooled to 5° C. while 58.8 g. of m-methoxybenzyl cyanide is added, the resulting mixture is stirred at 5° C. for 90 minutes, and it is then treated dropwise with 73.8 g. of isopropyl bromide while the temperature is kept below 5° C. The reaction mixture is allowed to warm to 20° C., and is then heated under reflux for 2 hours. Upon cooling, it is washed with two 200-ml. portions of water, with 100 ml. of 2 N hydrochloric acid, and with 200 ml. more of water, and is dried. The dried solution is evaporated, and the residue is distilled to give α-isopropyl-m-methoxybenzyl cyanide; B.P. 98–104° C. (0.3–0.4 mm.). This intermediate product (62 g.) is added to a stirred suspension of 12.8 g. of sodium amide in 170 ml. of dry benzene kept at 5° C., and the resulting mixture is heated under reflux for 3 hours. It is then cooled again to 5° C. while 100 ml. of ethylene dichloride is added, and this new reaction mixture is allowed to warm to room temperature and is heated under reflux for 3 hours. Upon cooling, it is washed with 250 ml. of water, with 100 ml. of 2 N hydrochloric acid, and with 200 ml. more of water, dried, evaporated, and the residue distilled to give 1-chloro-3-(m-methoxyphenyl)-3-cyano-4-methylpentane; B.P. 136–140° C. (0.8 mm.). This second intermediate product (19.3 g.) is dissolved in 100 ml. of anhydrous ether, and the ethereal solution is added to a stirred suspension of 5.0 g. of lithium aluminum hydride in 150 ml. of anhydrous ether in such manner so as to maintain gentle reflux. The mixture is then heated under reflux for 5 hours, kept at room temperature overnight, and cautiously treated with 10 ml. of water and 15 ml. of 2 N sodium hydroxide. The aqueous mixture is heated under reflux for one hour, cooled, and filtered. The ethereal phase is separated, dried, and distilled to give 3 - (m-methoxyphenyl)-3-isopropylpyrrolidine; B.P. 114–122° C. (0.5 mm.).

By the foregoing general procedure, starting from m-methoxybenzyl cyanide and an alkyl halide, the following are illustrations of other products obtained. 3-(m-methoxyphenyl)-3-isobutylpyrrolidine, B.P. 120–124° C. (1.0 mm.); is prepared from 1-chloro-3-cyano-3-(m-methoxyphenyl)-5-methylhexane, B.P. 120–125° C. (0.4–0.5 mm.), which is in turn prepared from α-isobutyl-m-methoxybenzyl cyanide, B.P. 117–122° C. (0.8 mm.). 3-(m-methoxyphenyl)-3-sec-butylpyrrolidine, B.P. 122–124° C. (0.5 mm.); is prepared from 1 - chloro-3-cyano-3-(m-methoxyphenyl)-4-methylhexane, B.P. 115–120° C. (0.2 mm.), prepared in turn from α-sec-butyl-m-methoxybenzyl cyanide, B.P. 102–104° C. (0.2 mm.). 3-(m-methoxyphenyl)-3-isopentylpyrrolidine, B.P. 120–125° C. (0.15 mm.), is prepared from 1-chloro-3-cyano-3-(m-methoxyphenyl)-6-methylheptane, B.P. 137–145° C. (0.2–0.4 mm.), prepared in turn from α-isopentyl-m-methoxybenzyl cyanide, B.P. 120–125° C. (0.5–0.6 mm.).

I claim:
1. A member of the class consisting of compounds of the formula

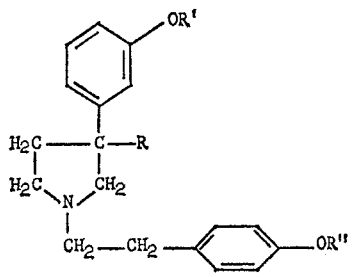

and salts thereof; where R is an alkyl radical containing from 2 to 5 carbon atoms inclusive; and each of R' and R" is a member of the class consisting of hydrogen and groups of the formula

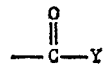

where Y is a member of the class consisting of lower alkyl, cyclopropyl, and cyclobutyl.

2. A compound according to claim 1 which is m-[1-(p-hydroxyphenethyl)-3-propyl-3-pyrrolidinyl]phenol.

3. A compound according to claim 1 which is m[1-(p-hydroxyphenethyl)-3-isobutyl-3-pyrrolidinyl]phenol.

4. A compound according to claim 1 which is m-[1-(p-hydroxyphenethyl)-3 - propyl-3-pyrrolidinyl]phenol, diacetate ester.

References Cited
FOREIGN PATENTS
786,794    6/1968    Canada _____ 260—326.5

OTHER REFERENCES
Morrison et al.: Organic Chemistry (1959), p. 572.

ALEX MAZEL, Primary Examiner

J. A. NARCAVAGE, Assistant Examiner

U.S. Cl. X.R.
260—326.5 E, 326.5 M, 465 F; 424—274